(12) United States Patent
Perin et al.

(10) Patent No.: US 12,459,013 B2
(45) Date of Patent: Nov. 4, 2025

(54) COANDA EFFECT INDUCED LAMELLAE CLEANING SYSTEM FOR WASTEWATER AND DRINKING WATER TREATMENT CLARIFIER

(71) Applicant: VEOLIA WATER SOLUTIONS & TECHNOLOGIES SUPPORT, Saint-Maurice (FR)

(72) Inventors: Guillaume Perin, Pierrefonds (CA); Martin Caspar, Montréal (CA); Christian Scott, Montréal (CA); Guillaume Jeudy, Montréal (CA)

(73) Assignee: VEOLIA WATER SOLUTIONS & TECHNOLOGIES SUPPORT, Saint-Maurice (FR)

( * ) Notice: Subject to any disclaimer, the term of this patent is extended or adjusted under 35 U.S.C. 154(b) by 494 days.

(21) Appl. No.: 18/005,019

(22) PCT Filed: Jun. 22, 2021

(86) PCT No.: PCT/CA2021/050848
§ 371 (c)(1),
(2) Date: Jan. 10, 2023

(87) PCT Pub. No.: WO2022/011451
PCT Pub. Date: Jan. 20, 2022

(65) Prior Publication Data
US 2023/0330714 A1    Oct. 19, 2023

Related U.S. Application Data

(60) Provisional application No. 63/051,509, filed on Jul. 14, 2020.

(51) Int. Cl.
*B08B 5/02* (2006.01)

(52) U.S. Cl.
CPC .......... *B08B 5/02* (2013.01); *B08B 2205/005* (2013.01)

(58) Field of Classification Search
CPC ........................... B08B 5/02; B08B 2205/005
See application file for complete search history.

(56) References Cited

U.S. PATENT DOCUMENTS

| | | | |
|---|---|---|---|
| 4,927,543 A | 5/1990 | Bablon et al. | |
| 5,840,195 A | 11/1998 | Delsalle et al. | |
| 9,868,077 B2 | 1/2018 | M et al. | |

FOREIGN PATENT DOCUMENTS

IN    201911006221 A    8/2020

*Primary Examiner* — Thuan D Dang
(74) *Attorney, Agent, or Firm* — Jacob M. Ward; Ward Law Office LLC

(57) ABSTRACT

A method and apparatus for a Coanda effect-induced tube settler assembly lamellae cleaning system for raw water or semi-potable drinking water treatment clarifier. A tangential compressed air source is injected from compressed air tubes near J-shaped support deflector beams. The combined high pressure air from a high pressure fixed air grid and waste water fluid flow stream in a main waste water stream to be clarified, creates a Coanda-effect fluid inducing turbulence when used in conjunction with cross-sectionally J-shaped deflector beams. This combined fluid flowstream provides hydrodynamic cleaning pressure axially through the tubes' lumen of the tube settler assembly within a clarifier cell basin enclosure.

20 Claims, 9 Drawing Sheets

COANDA EFFECT INDUCED LAMELLAE CLEANING SYSTEM FOR WASTEWATER AND DRINKING WATER TREATMENT CLARIFIER

CROSS-REFERENCE TO RELATED APPLICATIONS

This patent application is a United States National Stage of International Patent Application No. PCT/CA2021/050848, filed Jun. 22, 2021, which in turn claims the benefit of U.S. Provisional Patent Application No. 63/051,509 filed Jul. 14, 2020. The entire disclosures of the above patent applications are incorporated herein by reference.

FIELD OF THE INVENTION

This invention relates to potable water and wastewater purification, and more particularly to a method and an apparatus for cleaning the elongated settling tube inner channels inside the downstream lamellar settling basin of a raw water treatment assembly.

BACKGROUND OF THE INVENTION

In water clarification processes, water treatment plants include a number of water clarification steps, usually comprising successively a first coagulation basin, a second flocculation basin, and a floc settling clarifier basin. Treated purified water is transferred in between successive basins via suitable transfer means such as overflow channels. A step of injecting a granular material such as sand can be added to lead to ballasted-flocculation. A water mixer with rotating blades suited with or without a sedimentation enhancing hydrocyclone may be installed in at least one of the first, second and/or eventually in a third basins. A scraper and a tube settler assembly, also called lamellae, may be installed in the clarifier basin.

Settling tubes comprise a plurality of downwardly obliquely inclined hollow elongated tubes, through which flows raw water to be clarified, and into which sediments and other solid contaminants will become deposited under gravity forces. The purpose of the tube settler assembly is to increase the surface area exposed to the raw water (e.g. waste water or semi-potable water) such that, upon progressive gravity-borne decantation of sediments from raw water onto the sloping surface of the settling tubes lumen or inner channels, the effective sediment settling and collecting area is increased relative to only the clarifier cell flooring.

A problem with such a tube settler assembly is that each such elongated hollow tube inner lengthwise channel will periodically become plugged by the diametral build-up of solid contaminants depositions, from progressive reduction of the inner free diameter of the tube lumen and thus adversely affecting the performance and efficiency of the water flow through settling process. Thus, repeated cleaning of the settling tubes to remove the build-up of sludge inside the tubes channels over time is required, i.e. to remove this build-up of material in the inner channel of the settling tubes, e.g. manually with high pressure water or with compressed air. That is to say, aero- or hydro-dynamic forces are applied to the bottom end mouth of the settling tubes axially of the settling tubes to forcibly push said sediments lengthwisely of settling tubes channels so that these sediments become expelled and collected from the settling tubes through the opposite top end mouth of the settling tubes for release to a discharge dump. However, an unsolved problem has been identified in prior art cleaning systems in that structural damage to the tube settler assembly may occur with these prior art high pressure water or air cleaning means.

Inefficiencies in tube settler assembly cleaning has been a long standing issue in the field of industrial raw water treatment. The prior art discloses a number of inefficient methods to manually or automatically clean lamellae. Manual cleaning is not easy because of health hazards to human workers, confined labour space conditions, etc. . . . . In-situ automatic lamellae cleaning systems are expensive and complicated to use because prior art lamellae tube settler structural support beams are not designed to carry automatic cleaning systems, i.e. supporting systems and air delivery pipes. In addition, no cleaning method is currently available to applicant's knowledge to reduce sludge accumulation on existing structural support beams for the tube settler assembly, because of added weight constraints. Indeed, conventional structural cross-sectionally I-beams in clarifier cells will obstruct air/raw water flow through at least part of the lamellae lumen, and will thus compromise the efficient air cleaning thereabout.

U.S. Pat. No. 9,868,077 (US 077') issued 16 Jan. 2018 (inventor David Hambley) discloses a method and apparatus for in situ cleaning of the settling tubes in water clarification clarifier cells. High pressure air supply pipes are provided to distribute air to the tube settler assembly and extend along the length thereof, and each terminate with a closed end to prevent air escape under pressure from the opposite ends of the air supply pipes. A plurality of tube laterals are connected to the air supply pipes, and are said to emit air under pressure below the tube settler assembly through discharge holes so positioned as to emit air upwardly or outwardly from the tube laterals and to enter the bottom of the tube settler assembly with some force which biases the emitted air and entrained liquid to dislodge sediments within the settling tubes.

The tube settler assembly of US 077' is supported by a plurality of I-beams connected to a support rail which extend normal to the settling tube laterals. An air deflector is positioned over the tube laterals. This air deflector is said to create a "turbulence condition" between the released air and the water stream to assist the entrainment process of air mixed with water to be clarified, to further assist in sediment dislodgment within settler tubes. Noteworthy, the profile of air deflector is not a smooth arcuate shape, but rather an irregular elbowed shape with intermediate sharp ridges or edges. Air deflector is said to be perforated with openings so as to release and direct air upwardly into these tubes of the tube settler assembly which may become plugged due to the position of the obstructing support structure I-beam sections.

A general object of the present invention is to improve upon U.S. Pat. No. 4,927,543 "method and installation for treating liquid by sedimentation using fine sand", known in the trade as the ACTIFLO (trademark) system.

Another object of the present invention is to address drawbacks from the prior art lamellae cleaning systems.

An object of the invention is to enable any other existing decanter or water treatment apparatuses having tube settlers to be easily and at minimum cost retrofitted with the present lamellae cleaning system.

SUMMARY OF THE INVENTION

The present invention generally relates to a method and apparatus for a Coanda effect-induced tube settler assembly lamellae cleaning system for wastewater and drinking water treatment clarifier. A tangential compressed air source is injected from compressed air tubes near J-shaped support deflector beams. High pressure air from a high pressure fixed air grid combined with raw water fluid flow stream, creates a Coanda-effect fluid inducing turbulence when used in conjunction with cross-sectionally J-shaped deflector beams. This combined fluid flowstream provides hydrodynamic cleaning pressure axially through the tubes' lumen of the tube settler assembly within a clarifier cell basin enclosure.

In one embodiment, there is disclosed a method to dislodge sediment retained within the lumen of individual tubes from a tube settler assembly used for raw water clarification, said method comprising the steps of: —providing high pressure air power supply means;

providing a number of first perforated pipes; —releasing high pressure air from said air power supply means through said first perforated pipes beneath said tube settler assembly, to generate first fluid flow from combined high pressure air and raw water; —providing arcuate smooth deflectors at a location between said tube settler assembly and said first perforated pipes and located in the pathway of said first fluid flow, said deflectors of such size, shape and number as to generate turbulence of the Coanda-effect type of said first fluid flow; —driving said first fluid flow towards and through the bottom mouth of tubes' lumen of tube settler assembly and thereinto in such a way as to dislodge sediments trapped therein.

There could be further provided perforated tube laterals intermediate said tube settler assembly and said first perforated pipes and in transversely spaced register from said deflectors; the method then comprising the further step of releasing high pressure air from said air power supply means into said perforated tube laterals, wherein further second fluid flows are generated and directed towards said deflectors from combined high pressure air and raw water, so that still enhanced Coanda-effect type fluid flow turbulence is achieved; whereby the trapped sediments in the tubes' lumen of said tube settler assembly are further dislodged by combined interaction of said first fluid flow and said second fluid flow.

Said arcuate deflectors could each define an external exposed convex wall and an internal concave wall, said deflectors oriented in such a way relative to said first perforated pipes and said perforated tube laterals wherein there would be further steps of said first fluid flow striking corresponding deflector concave walls (FIG. 6) and said second fluid flow striking corresponding deflector convex walls.

In another embodiment, the invention relates to an apparatus to remove sediment retained within the lumen of tubes from a tube settler assembly in a raw water clarification process, said apparatus for use inside an enclosure formed inside a basin from a clarifier cell and spacedly over a flooring defined by this basin, said apparatus comprising: a tube settler assembly having a number of obliquely inclined elongated hollow settling tubes each defining bottom mouth opening into an inner lumen; a number of transversely spaced first perforated pipes extending spacedly beneath said tube settler assembly; an air compressor member, operatively connected to said first perforated pipes; each of said first perforated pipes defining peripheral and lengthwisely spaced air escape ports through which high pressure air from said air compressor member escapes, so that a first fluid flow from combined high pressure air and raw water is generated outside of said first perforated pipes; and Coanda effect inducing means, mounted through the pathway of said first fluid flow between said first perforated pipes and said lumen bottom mouth of tube settler assembly and generating fluid flow turbulence improving sediment cleaning within said tubes' lumen of tube settler assembly.

Said Coanda effect—inducing means could consist in one embodiment of at least a few arcuate deflectors mounted and oriented within the clarifier cell enclosure in such a way relative to said air escape ports from which high pressure first fluid flow exits that a Coanda-effect fluid flow turbulence is generated, thus enhancing sediment removal capacity of said apparatus; said arcuate deflectors defining a peripheral smooth arcuate profile, for example cross-sectionally J-shape and further forming structural beams for support of said settler assembly spacedly over the clarifier cell basin flooring. Said arcuate deflector could define two opposite legs and a web joining the latter, and wherein the angular value $\ominus$ of said deflector web is about 60°.

The air outflow rate from at least one of said first perforated pipes through corresponding said air escape ports could range between 15 to 40 square meter ($m^2$) per hour per $m^2$ of tube settler lumen surface, for example at about 25 $m^2$. The center distance between the successive transversely spaced first perforated pipes could range between 300 and 430 mm, for example about 350 or 380 mm. The interspacing between successive said air escape ports of first perforated pipes could then be irregular and range between 50 and 150 mm, for example about 100 mm.

In one embodiment, there is further included perforated tube laterals, operatively connected to said air compressor member and further providing structural beam support for said tube settler assembly and mounted in transversely spaced register with corresponding said arcuate deflectors, said tube laterals having a plurality of lengthwisely and peripherally spaced air escape bores oriented in such a fashion as to further promote Coanda-effect induced fluid flow towards said tubes' lumen bottom mouth and through and into the tubes lumen of tube settler assembly.

These arcuate deflectors could then each define an external convex wall and an internal concave wall, each said deflector convex wall being oriented for strike by said first fluid outflow from said perforated tube laterals while each said deflector concave wall being oriented for strike by the first fluid flow from said first perforated pipes.

DETAILED DESCRIPTION OF THE EMBODIMENT OF THE INVENTION

Figure 1:
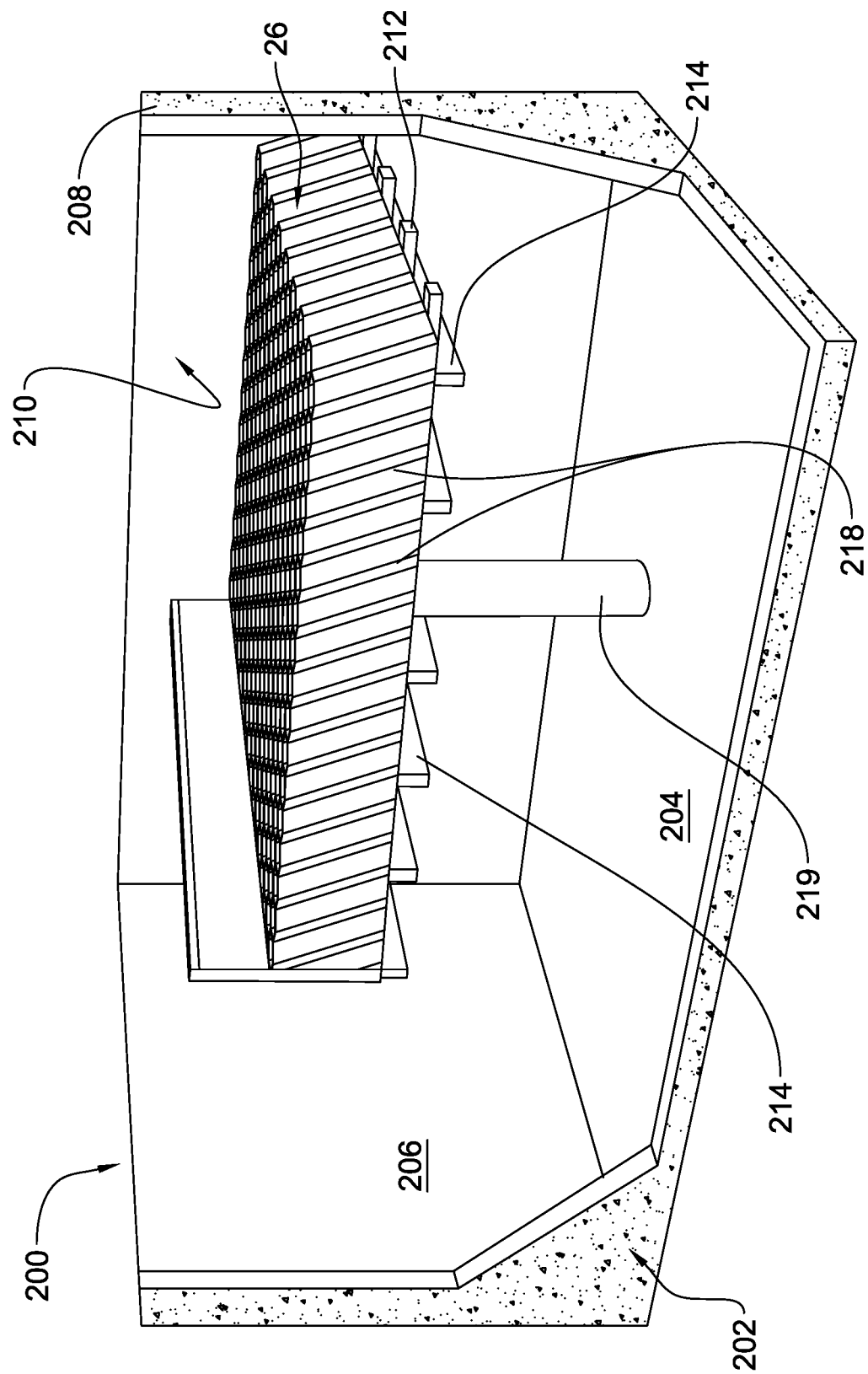
FIG. 1 is a partial diagrammatic isometric view of a concrete clarifier cell, with part of the peripheral wall thereof removed for clarity of the view, and illustrating a tube settler assembly, or lamellae, and associated transverse support beams beneath the tube settler assembly made of obliquely downwardly inclined settling tubes, these support beams supporting the settling tubes spacedly over the clarifier cell basin flooring.

FIG. 1 shows a clarifier cell 200 fitted with an overhanging tube settler assembly 26. Clarifier cell 200 may consist as illustrated of a concrete basin 202 having a flooring 204, a peripheral wall 206 and a top open mouth 208, wherein an enclosure 210 is formed. This clarifier basin 202 can be part of for example an Actiflo, so located downstream relative to an upstream coagulation basin, then an injection basin, and a maturation basin (not shown). In the Actiflo, raw water (e.g. waste water or semi-potable drinking water) to be clarified enters initially into the coagulation basin; this coagulated raw water then flows to the polymer/microsand injection basin; and this partly treated raw water then overflows into the a maturation (also called flocculation) basin, before entering into the enclosure of the present lamellae clarifier basin 202. The present clarifier basin 202 is not limited to the Actiflo, and could be fitted to other suitable decanters.

Figure 2:
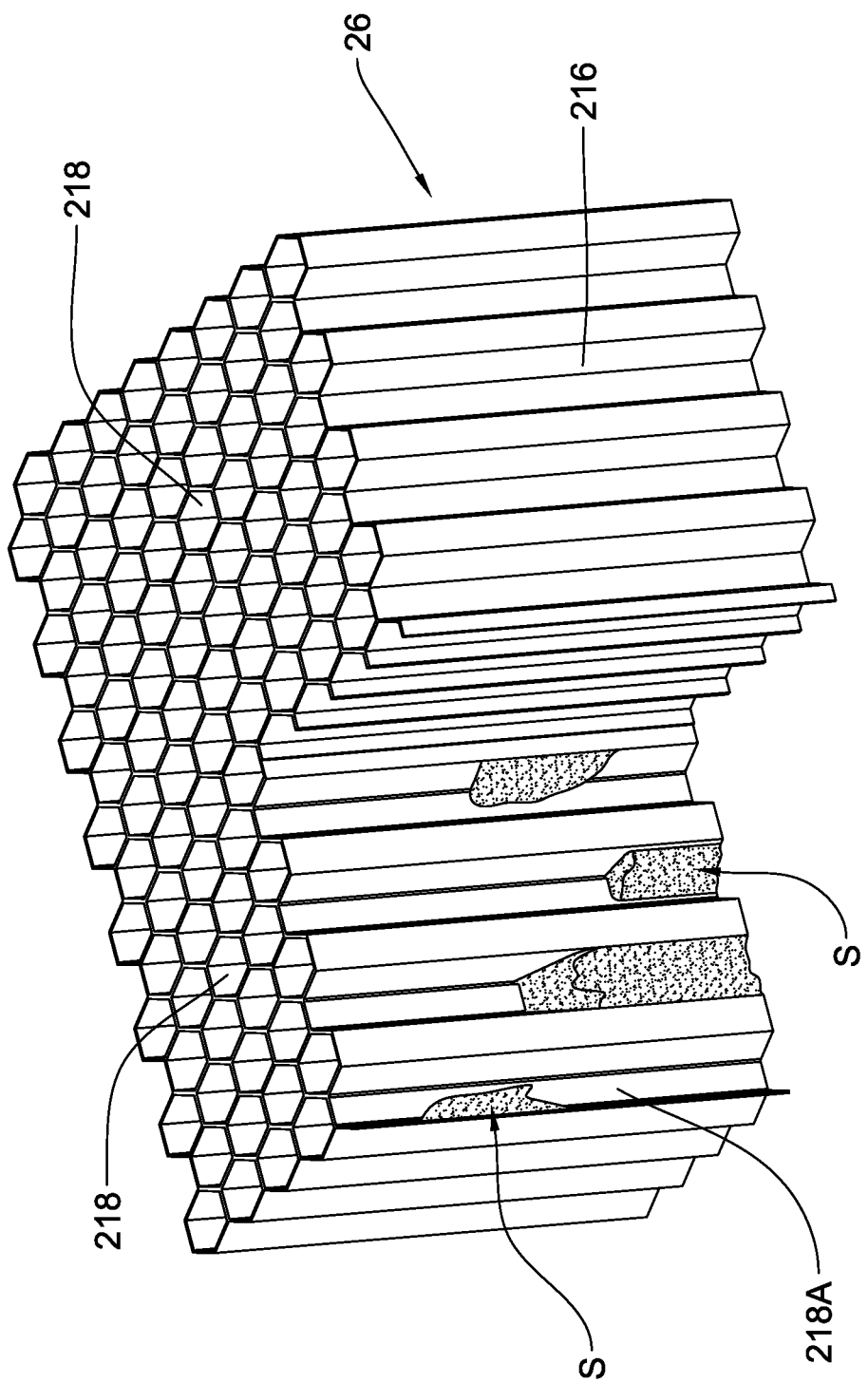
FIG. 2 is an enlarged diagrammatic isometric view of an array of interconnected partly broken settling tubes from FIG. 1, suggesting how raw water sediments deposit and progressively obstruct and plug the lumen of the settling tubes.

The tube settler assembly 26 is supported spacedly over basin flooring 204 by a number of transverse beams 212 which are themselves transversely connected to a number of supporting rails 214 extending transverse to beam 212. In one embodiment, the array formed by rails 214 and structural beams 212 form a monolithic structure supported over flooring 204 by an upright central foot 219. Beams 212 may be e.g. I or H-shaped in cross-section. Tube settler assembly 26 consists of a plurality of hollow elongated tubes or lamellae 216 (FIG. 2). Tubes 216 are downwardly obliquely inclined, making an angular value of e.g. 30o relative to the vertical, so that sloping sediment collecting bottom surfaces 218A be formed within the lumen or inner channel 218 thereof for accommodating accumulating sediments S under decantation gravity forces.

Figure 3:
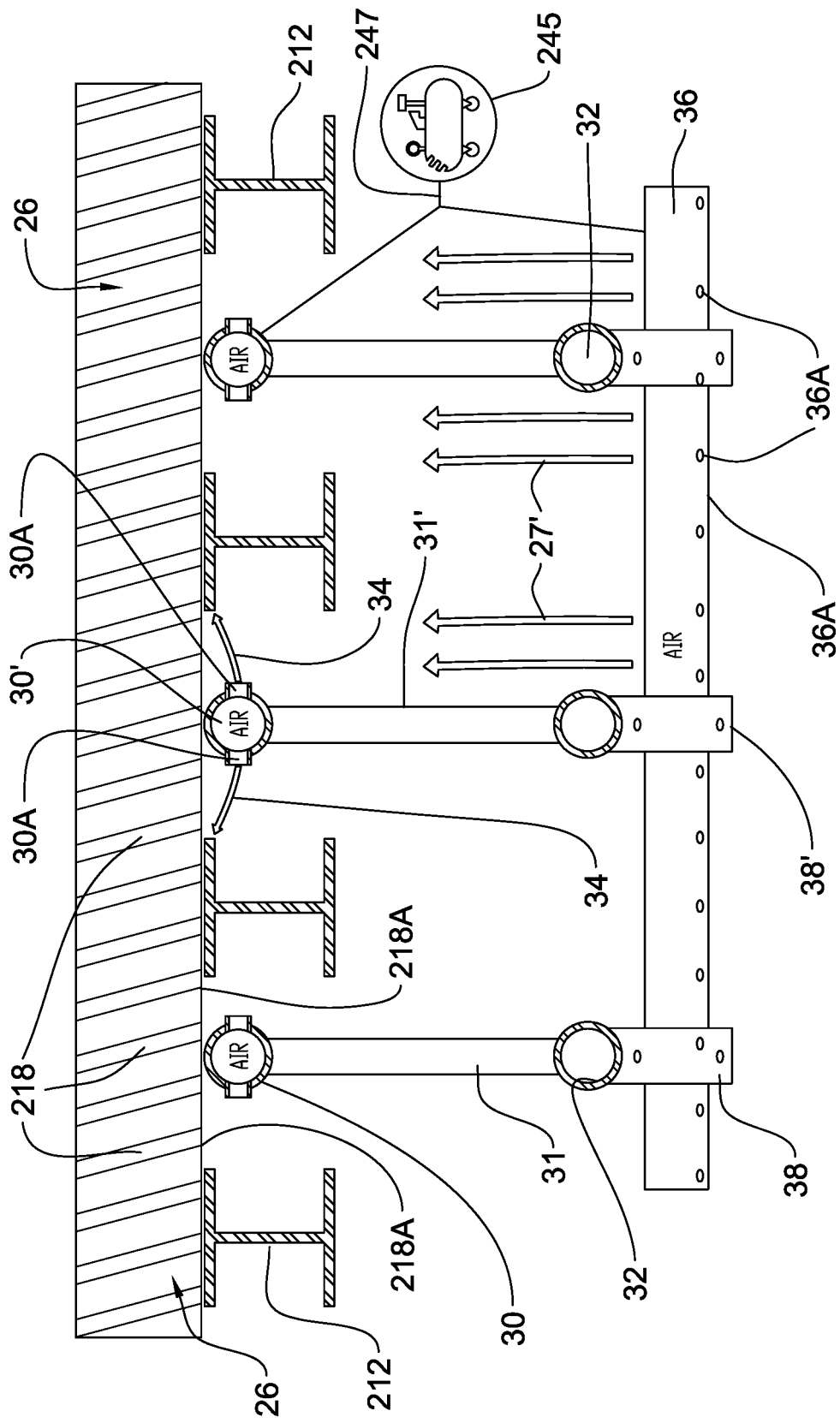
FIG. 3 shows a first embodiment of lamellae cleaning system for retrofit installation to existing legacy clarifier cells having standard structural support H-beams, including a partial sectional view of a tube settler assembly with four structural support cross-sectionally H-shaped beams shown in cross-section, showing one bottom first perforated high air pressure pipe and three top perforated tube laterals cleaning system for cleaning the tubes' lumen of tube settler assembly, and further showing fluid flow arrows suggesting high pressure air flow combined with raw water flow patterns generated by the compressed fluid cleaning system.
Figure 4:
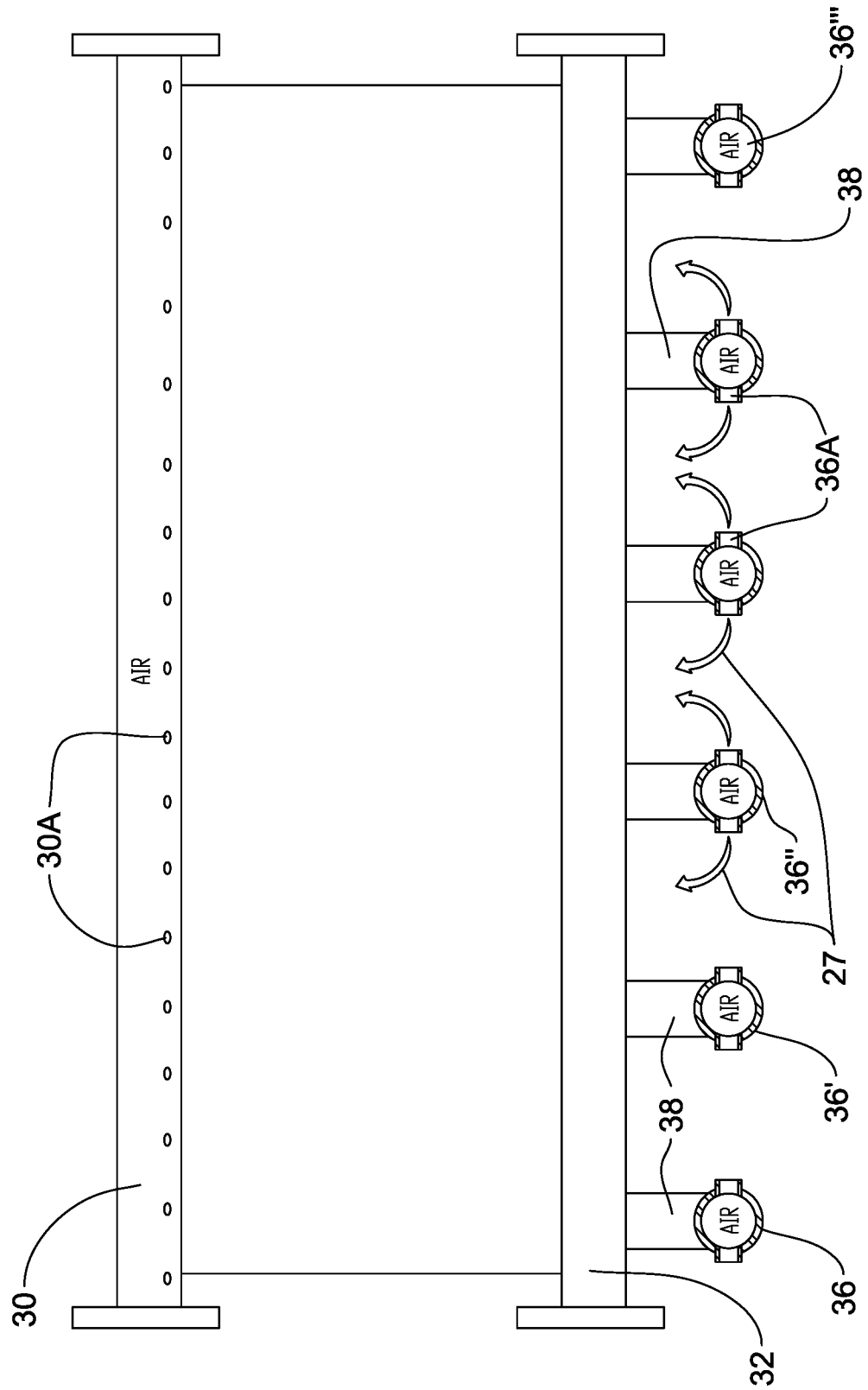
FIG. 4 is a view similar to FIG. 3 but rotated by a quarter of a turn relative thereto and with the I-beams and tube settler assembly removed for clarity of the view and showing a number of first perforated bottom pipes and one perforated top tube lateral forming the cleaning system for cleaning the tubes' lumen of tube settler assembly, with bottom arrows suggesting fluid flow.
Figure 5:
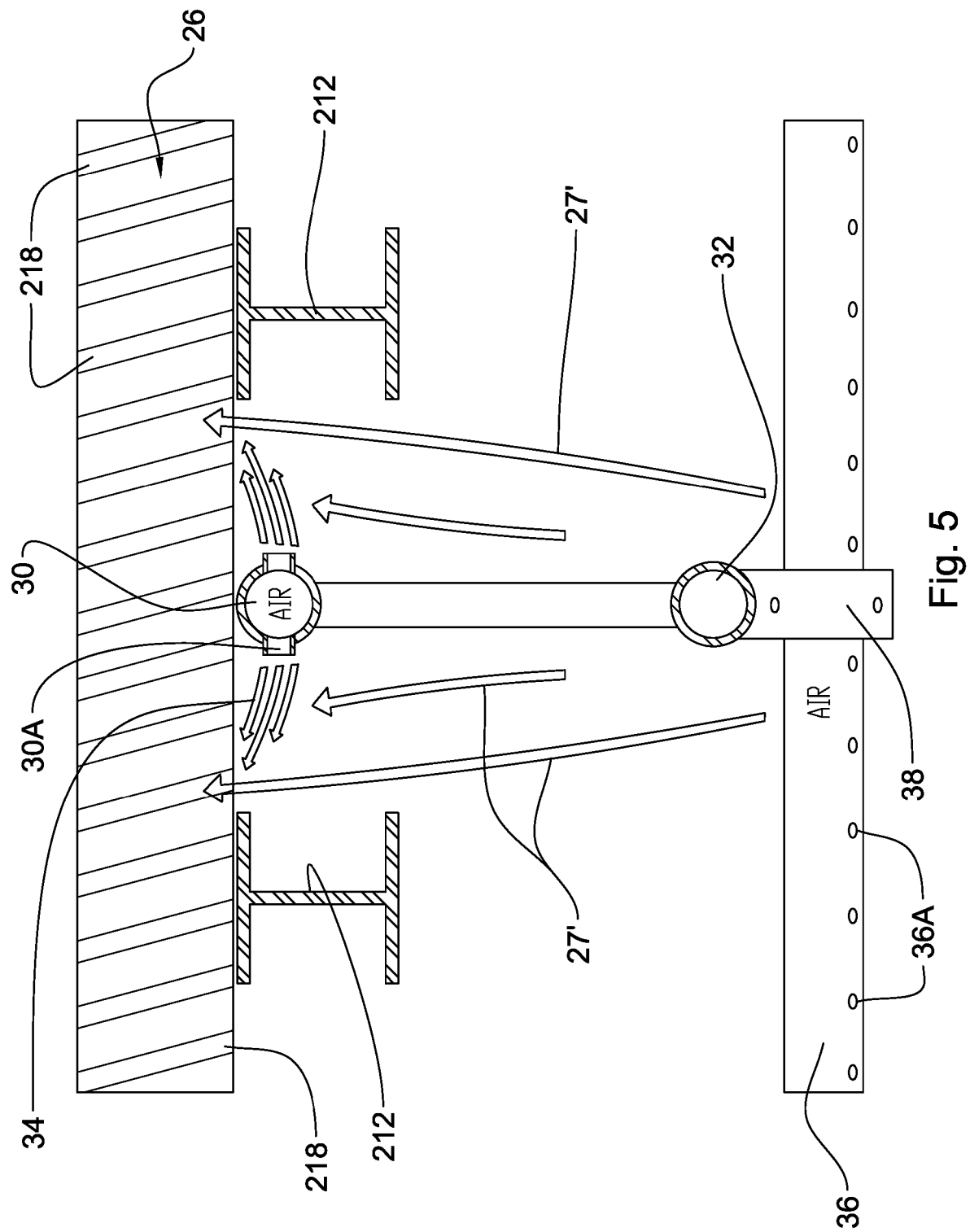
FIG. 5 is a view similar to FIG. 3 but at an enlarged scale, and suggesting varying speed and load levels of fluid flow patterns within the waste water volume containing clarifier cell enclosure associated with length and width of said arrows.

FIGS. 3 to 5 show an embodiment of lamellae cleaning system that is installed in retrofit fashion to an existing legacy clarifier cell with standard structural support cross-sectionally H-(or I) beams. Structural support cross-sectionally H-shape-beams 212 support the tube settler assembly 26 spacedly over floor 204. Open ended elongated high air pressure tube laterals 30, 30', extend generally horizontally beneath tube settler assembly 26 and constitute support beams for the tube settler assembly 26. Structural support cradle beams 212 are cleaned with fluid flow (e.g. air flow in one embodiment) (arrows 34) escaping through transverse peripheral bores 30A from tube laterals 30, 30', . . . and towards bottom mouth 218A of lumen 218 from settler tubes 216.

Structural integrity support beams 32 are mounted downwardly spacedly at a distance from and parallel to tube laterals 30 to support tube settler assembly 26 via transverse connector arms 31. Second transversely spaced high pressure perforate pipes 36 extend transversely beneath structural supports 32 and orthogonally thereto and are supported thereto by mounting clips 38, 38'. Second perforated bottom pipes 36 are perforated all along their length at 36A. High pressure air escaping from bores 36A mixes with raw water from the volume thereof inside the clarifier cell basin enclosure 210, before reaching the tube lumen 218 of lamellae 216 (also called settling tubes) of tube settler assembly, as suggested by arrows 27 in FIG. 4. An air compressor 245 feeds compressed air to high air pressure tubes via split or Y-shape fluid line 247. Top perforated tube laterals 30 extend orthogonally relative to the bottom first perforated pipes 36.

In one embodiment as shown in FIG. 3 of the drawings, interspacing of successive air escape bores 36A of high pressure first perforated pipes 36 is generally equidistant. In one embodiment as shown in FIG. 4, interspacing of successive air escape bores 30A of high pressure air tube laterals 30 is also generally equidistant. High pressure air flows 27 escaping through bores 36A of high pressure air perforated pipes 36 are oriented in such a fashion by the relative position and shape thereof towards the bottom end mouth 218A of settler tubes lumen 218 along air flow arrows 27'.

Figure 6:
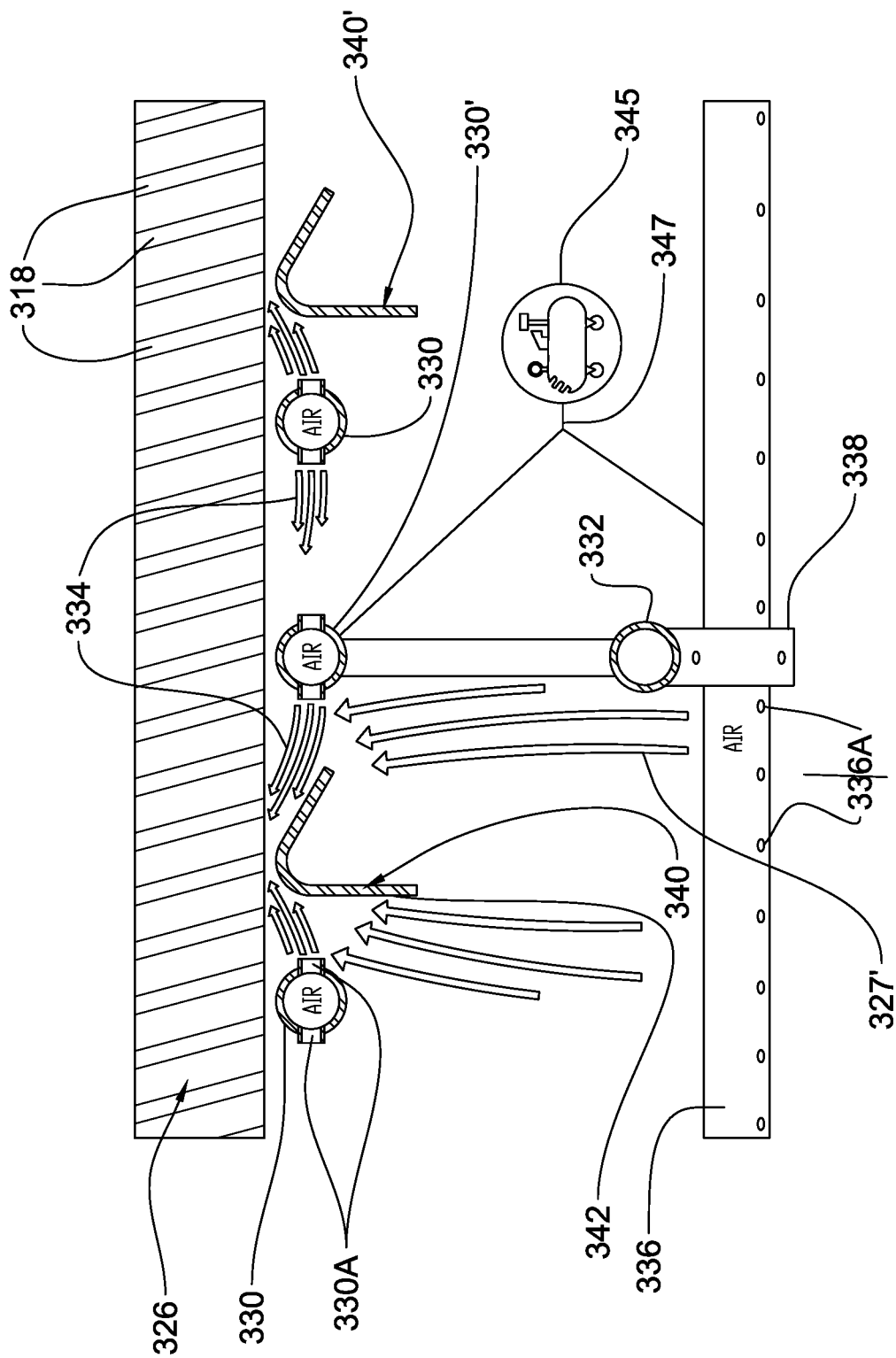
FIG. 6 is a view similar to FIG. 5 but showing another embodiment of the present lamellae cleaning system adapted for newly built clarifier cells and including a pair of cross-sectionally J-shape deflectors also forming structural support beams for the tube settler assembly and transversely spaced from one another, generating Coanda effect induced fluid streams, and also showing an air compressor operatively connected to the top tube laterals and bottom perforated pipes.
Figure 7:
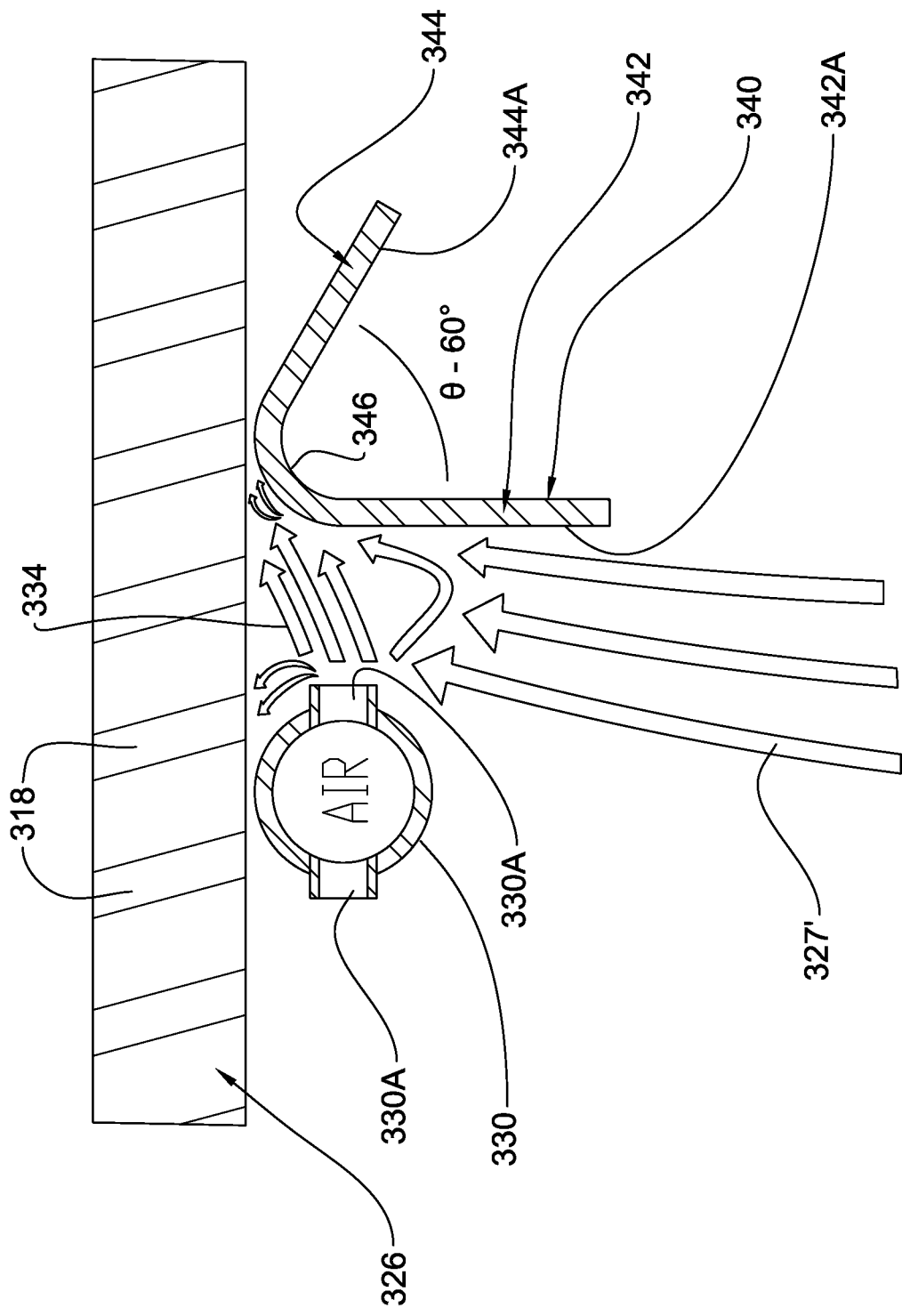
FIG. 7 is an enlarged view of the left-hand side of FIG. 6, and suggesting varying speed and load of fluid flow patterns associated with length and width of said arrows.

In the other lamellae cleaning embodiment of FIGS. 6 and 7, for newly built clarifier cell structures are identified by corresponding 300-series numerals. The I-beams (or H-beams) 212 from FIGS. 1 to 5 are replaced by cross-sectionally arcuate smooth profile structural support beams 340, 340', . . . supporting spacedly over ground the tube settler assembly into the enclosure 210 (FIG. 1) of floc settling clarifier basin.

In one embodiment, deflectors 340 are cross-sectionally J-shape beams 340. J-beams 340 may be e.g. made from plied steel. J-beams 340 come in transverse spaced register with corresponding high air pressure outlets or bores 330A transversely of tube laterals 330. Each J-beam deflector 340 includes: a main elongated outer leg 342, in downwardly inclined fashion extending transversely to the fluid flow exiting from air escape bores 330A of top tube laterals 330 and also transverse to adjacent basin wall 206 (FIG. 1); an inner shorter leg 344 divergent by an angular value of e.g. 60° from opposite outer leg 342A, and a web 346 joining legs 342 and 344 in a smooth external surface fashion. J-beam diverging leg 344 also comes in sloping register with a corresponding tube lateral 330'. Air flow (arrows 334) escape from bores 330A of high air pressure tube laterals 330 (FIG. 6). An air compressor 345 feeds compressed air to top tube laterals 330 and bottom perforated pipes 336 via split or Y-shape fluid line 347.

Bottom perforated pipes 336 extend transversely beneath structural support 332, forming a fixed air grid and supported thereto by mounting clips 338. Each of said perforated bottom pipes 336 are perforated all along their length for generating fluid flows 327' (e.g. air flow in one embodiment) towards cleaning lamellae lumen 318.

In one embodiment, successive bores 330A, and/or 336A, ... are equidistant to one another along the length of their respective top tube laterals 326, or bottom perforated pipes 336.

In operation, incoming raw water to be clarified and air from high air pressure perforated pipes 336 mix as rising fluid level inside enclosure 210 of clarifier basin 20 (FIG. 1), and also mix with high pressure transverse air flows 334, from air tube laterals 330, 330', respectively, and strike the J-beam exterior walls 342A and J-beam transverse inner wall 344A thereby generating fluid turbulence flow Coanda-effect that will promote lamellae cleaning inner channels 318 of the tubes from tube settler assembly 326. Such Coanda effect cleaning system reduces fixed set-up costs as well as variable operating costs, since manual cleaning requirement of these lamellae channels 318 is minimized. Alternatively, the cross-sectionally J-shape beams 340 can be replaced by tubular beams having a peripheral smooth arcuate profile without sharp ridges or edges, against which fluid (waste water/air) flow mixture is injected.

Structural parts in contact with lamellae modules may further be cleaned via localized compressed air injection combined with a mix of compressed air and raw water flow rate using the Coanda effect. Raw water comes from the main raw water stream and compressed air comes from the air scour cleaning system, i.e. perforated pipes 330 and/or 336.

Indeed, as known in the fluid mechanics art, a Coanda effect is known as the tendency of a jet of fluid emerging from an orifice to follow an adjacent flat or curved surface and to entrain fluid from the surroundings so that a region of lower fluid pressure develops in the fluid environment.

In existing installations, conventional I-beams or H-beams in FIGS. 3 to 5 structurally block access to parts of the lamellae, and thus compromise high pressure cleaning air from efficiently cleaning all tube settler assembly tubes' inner lumen surfaces.

To applicant's knowledge, no one in the prior art has ever thought about using a smooth surfaced arcuate (e.g. J-shape or tubular shape) beam profile to enhance fluid air and/or raw water flow efficiency to reach out more lamellae channels 318 from tube settler assembly areas for optimal cleaning operating thanks to the Coanda fluid turbulence effect.

An aspect of the present invention therefore consists, for new installations, of the combination of a tangential air scour injection from air tube laterals 330 near the J-shape support beams 342, with main combined raw water and high pressure air stream coming from a fixed air grid of tubes 336 located at the bottom of the air pipe supports, thus creating a Coanda-effect when used in conjunction with J-shape structural deflector beam 340. Each J-shape deflector beam 342 may have an alternate arcuate smooth profile, e.g. tubular, provided a Coanda effect is generated with the air/liquid combined fluid flow mixture.

Another aspect of the present invention in FIGS. 3 to 5 consists, for existing installations, of the retrofit combination of a tangential air scour injection from air tube laterals 30 near the existing support beams (typically the I- or H-beams 212), with combined main raw water and high pressure air stream and air coming from a fixed (or rotary) air grid of tubes 36 located at the bottom of the air pipe supports, thus creating a better cleaning effect near the existing structural beam.

Air pipe supports, composed by retaining clips 38 and structural support beam 32 component responsible for structural integrity, may be provided in standardized modular sections, easy to manufacture and to install, without the need for removing or modifying existing structural beams, and could be e.g. easily retrofitted into existing water treatment systems with tubes or plates settler.

For retrofit to existing water treatment plants, additional high air pressure perforated pipes 36 and supports 32 (FIG. 3) would be relatively easy and would allow for improved lamellae cleaning and cleaning of structural support beams.

On the other hand, for newly constructed raw water treatment plants, combination of J-shaped deflectors 340 with perforated pipes supports will offer a simple and effective solution to clean lamellae 318 concurrently with cleaning top end of structural beams (212 in FIGS. 3 and 5, typically not accessible with standard H or I beams).

Figure 8:
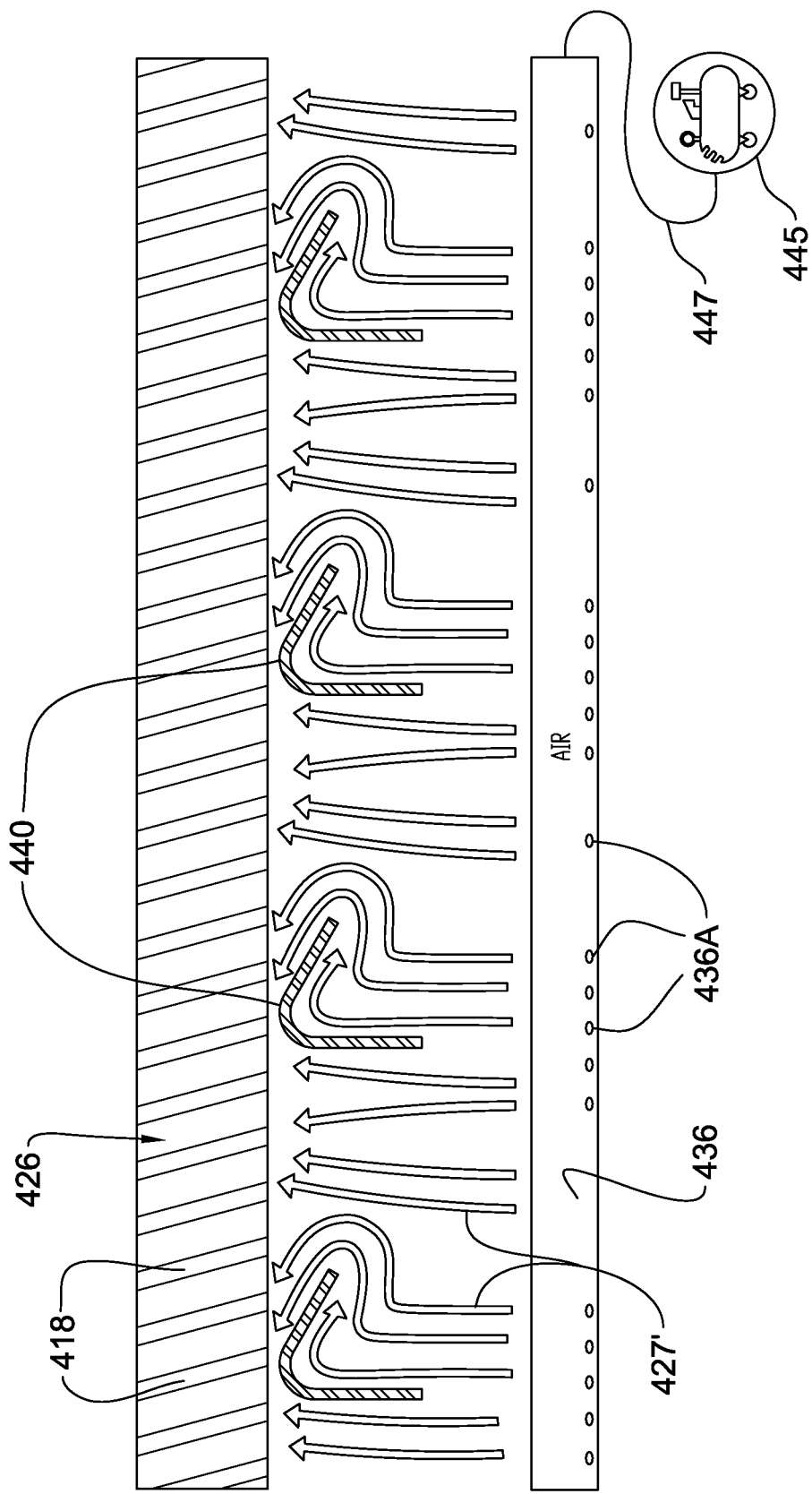
FIG. 8 is a view similar to FIG. 6 but showing an alternate embodiment of the invention where the top compressed air tube laterals adjacent the body of tube settler assembly have been removed, the number of arcuate deflectors has been increased to four, and the distance between air outlet ports in said bottom remaining second perforated pipes is irregular.
Figure 9:
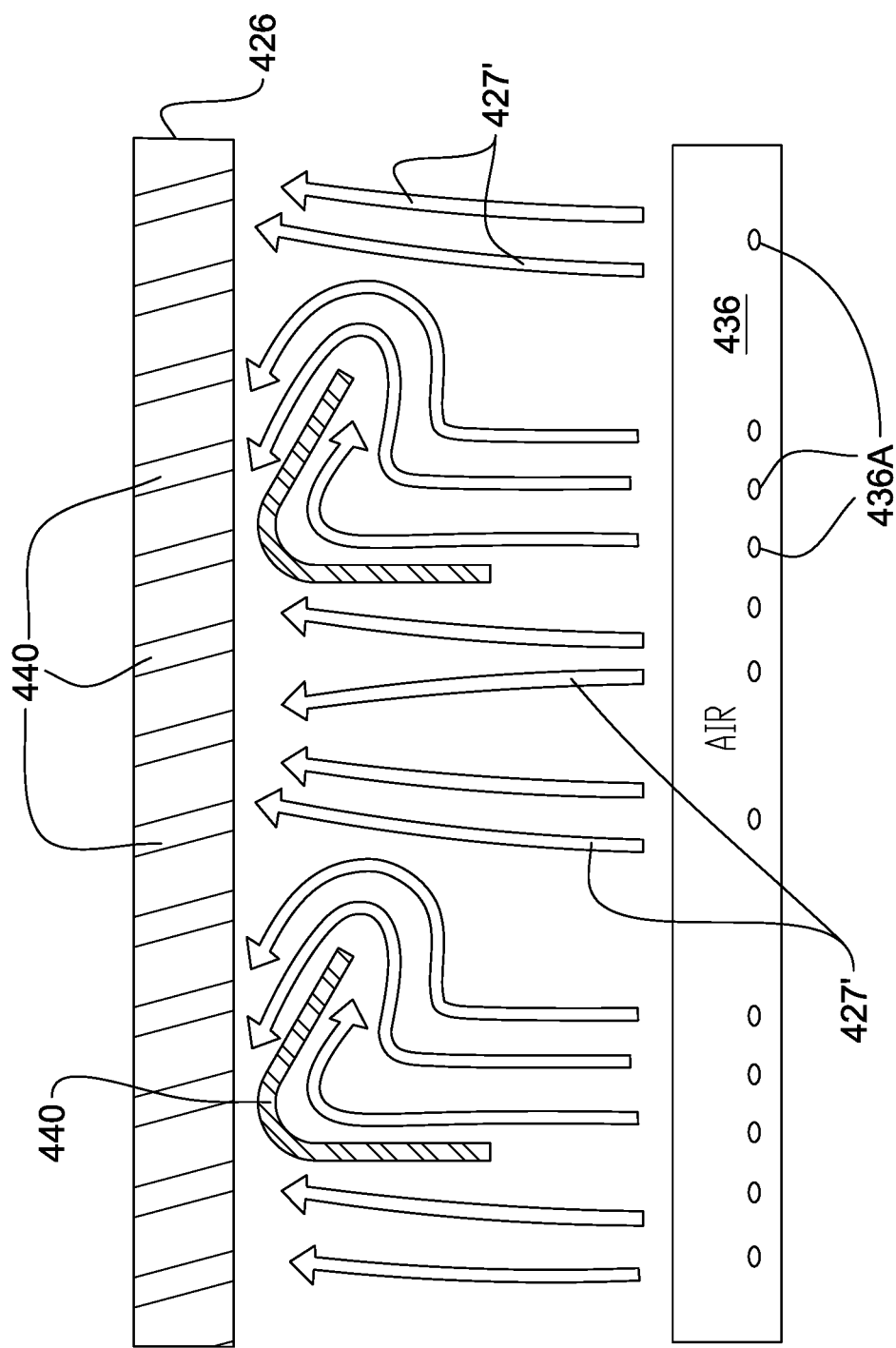
FIG. 9 is an enlarged section of the left-hand side portion of FIG. 8.

In the alternate embodiment of the invention shown in FIGS. 8 and 9 of the drawings, corresponding structures are identified by 400 series numerals. Compared to embodiment of 300 series in FIGS. 6-7, the top compressed air tube laterals adjacent the body of tube settler assembly 426 have been removed, and/or the number of arcuate deflectors 440 for a given volumic area has increased, and/or the distance between the tube settler assembly 426 and the bottom remaining second perforated pipes 436 has decreased, and/or the transverse gap between successive bottom perforated pipes 436 has slightly decreased (see FIG. 4 for corresponding series of perforated pipe structures 36, 36', ... ), and/or the distance between successive air outlet ports 436A in said bottom remaining bottom perforated pipes 436 becomes irregular. Such an alternate arrangement could be capable of generating capital cost savings reaching up to between 30 to 40% relative to the embodiment of FIGS. 6-7. An air compressor 445 feeds compressed air to high air pressure perforated pipes 436 via fluid line 447.

In one embodiment, the gap between the main body of the tube settler assembly 426 and the bottom second compressed air pipes 436 is reduced to about half that of embodiment of FIGS. 6-7.

In one embodiment, the angular value $\ominus$ of J-beam is about 60° as shown in FIG. 7, for improved performance. By having successive air outlet ports 436A, interspacing of bottom second compressed air pipes 436 that is irregular in the embodiment of FIG. 8 relative to the successively equidistant interspacing bottom air outlet ports 336A embodiment of FIG. 6, so-called chaotic pattern high air pressure outflows 427' is achieved; such chaotic air flow improves tube cleaning of inner channels 418 of tube settler assembly 426 from sediments depositing therein.

In one embodiment, the diameter of each air outlet port 336A (FIGS. 6-7) and/or 436A (FIGS. 8-9) ranges between 3 and 6 millimeters (mm), with best results at about 3 mm.

In one embodiment, a greater number of bottom perforated pipes 436 at the embodiment of FIG. 8 may slightly increase capital cost e.g. by about 5% relative to the embodiment of FIG. 6, but the overall capital cost of the concrete clarifier cell tube settler cleaning system still decreases by much more, e.g. by about 30 to 40%, because of the removal of all perforated top tube laterals 430.

In the embodiment of FIGS. 6-7:
a. the air outflow rate from compressed air tube laterals 330, and/or from bottom high air pressure perforated pipes 336, through corresponding air outlet ports 330, 336A, respectively ranges between 15 to 35 square meter ($m^2$), with improved results at about 25 $m^2$; and/or
b. the center distance between the successive bottom perforated pipes 336 ranges between 330 and 430 mm, with improved results at about 380 mm; and/or
c. the equidistant interspacing between successive air outlet ports 330A of top air tube laterals 330 and/or air escape ports 336A of bottom high pressure perforated pipes, 336, ranges between 75 and 175 mm, with improved results at about 125 mm.

On the other hand, in the embodiment of FIGS. 8-9:
a. the air outflow rate from bottom high air pressure perforated pipes 436 is slight greater than with the previous embodiment of FIGS. 6 and 7, ranging e.g. between 20 to 40 $m^3$ per hour per $m^2$ of tube settler lumen surface; and/or
b. the center distance between transversely spaced bottom perforated pipes 436 ranges between 300 and 400 mm, with improved results at about 350 mm; and/or
c. the irregular interspacing between successive air outlet ports 436A, 436A, . . . of bottom perforate pipes 436 is made irregular for performance optimization, and in one embodiment ranges between 50 to 150 mm, with improved results at about 100 mm.

In the lamellae cleaning system of FIGS. 8-9, perforated pipe 436 being closer to the tube settler assembly 426 (this gap therebetween being e.g. about half that of embodiment of FIGS. 6-7), there results improved monitoring and control of ambient compressed air pressure, and thus air speed thereof, in the area of tube settler assembly. Such a cleaning system provides at least a partial Coanda effect fluid turbulence, further enabling beam cleaning around J-shape deflectors 440.

We claim:

1. A method to dislodge sediment retained within a lumen of individual tubes from a tube settler assembly used for raw water clarification, said method comprising the steps of:
providing a high pressure air power supply means;
providing a number of first perforated pipes;
releasing high pressure air from said high pressure air power supply means through said number of first perforated pipes beneath said tube settler assembly, to generate a first fluid flow from combined high pressure air and raw water;
providing a smooth arcuate deflectors at a location between said tube settler assembly and said number of first perforated pipes and located in a pathway of said first fluid flow, said smooth arcuate deflectors of such size, shape and number as to generate turbulence of a Coanda-effect type of said first fluid flow; and
driving said first fluid flow towards and through a bottom mouth of tubes lumen of the tube settler assembly and thereinto in such a way as to dislodge sediments trapped therein.

2. The method as in claim 1,
further providing perforated tube laterals intermediate said tube settler assembly and said number of first perforated pipes and in transversely spaced register from said smooth arcuate deflectors; and
further releasing high pressure air from said high pressure air power supply means into said perforated tube laterals, wherein further a second fluid flow is generated and directed towards said smooth arcuate deflectors from combined high pressure air and raw water, so that still enhanced Coanda-effect type fluid flow turbulence is achieved;
whereby the trapped sediments in the tubes lumen of said tube settler assembly are further dislodged by combined interaction of said first fluid flow and said second fluid flow.

3. The method as in claim 2, wherein said smooth arcuate deflectors each defines an external exposed convex wall and an internal concave wall, said smooth arcuate deflectors oriented in such a way relative to said number of first perforated pipes and said perforated tube laterals wherein said first fluid flow strikes corresponding deflector concave walls and wherein said second fluid flow strikes corresponding deflector convex walls.

4. An apparatus to remove sediment retained within a lumen of tubes from a tube settler assembly in a water clarification process, said apparatus for use inside an enclosure formed inside a basin from a clarifier cell and spacedly over a flooring defined by the basin, said apparatus comprising:
a tube settler assembly having a number of obliquely inclined elongated hollow settling tubes each defining a bottom mouth opening into an inner lumen;
a number of transversely spaced first perforated pipes extending spacedly beneath said tube settler assembly;
an air compressor member, operatively connected to said number of transversely spaced first perforated pipes;
each of said number of transversely spaced first perforated pipes defining a peripheral and lengthwisely spaced air escape ports through which high pressure air from said air compressor member escapes, so that a first fluid flow from combined high pressure air and raw water is generated outside of said number of transversely spaced first perforated pipes; and
a Coanda effect inducing means, mounted through a pathway of said first fluid flow between said number of transversely spaced first perforated pipes and said bottom mouth of the tube settler assembly and generating fluid flow turbulence improving sediment cleaning within said lumen of tubes of the tube settler assembly.

5. The apparatus as in claim 4, wherein said Coanda effect inducing means consists of at least a few arcuate deflectors mounted and oriented within the enclosure of the clarifier cell in such a way relative to said air escape ports from which high pressure first fluid flow exits that a Coanda-effect fluid flow turbulence is generated, thus enhancing sediment removal capacity of said apparatus; said arcuate deflectors defining a peripheral smooth arcuate profile and further forming structural beams for support of said tube settler assembly spacedly over the flooring of the basin of the clarifier cell.

6. The apparatus as in claim 5, wherein each said arcuate deflector is cross-sectionally J-shape.

7. The apparatus as in claim 6, wherein each said arcuate deflector defines two opposite legs and a deflector web joining the two opposite legs, and wherein an angular value $\ominus$ of said deflector web is about 60°.

8. The apparatus as in claim 6, wherein an air outflow rate from at least one of said number of transversely spaced first perforated pipes through corresponding said air escape ports ranges between 15 to 35 square meter ($m^2$) per hour per $m^2$ of tube settler lumen surface.

9. The apparatus as in claim 8, wherein said air outflow rate from said number of transversely spaced first perforated pipes is about 25 $m^2$ per hour per $m^2$ of tube settler lumen surface.

10. The apparatus as in claim 6, wherein a center distance between successive of the number of transversely spaced first perforated pipes ranges between 330 and 430 mm.

11. The apparatus as in claim 10, wherein said center distance between successive of the number of transversely spaced first perforated pipes is about 380 mm.

12. The apparatus as in claim 6, wherein an interspacing between successive said air escape ports of the number of transversely spaced first perforated pipes is irregular and ranges between 50 and 150 mm.

13. The apparatus as in claim 12, wherein an air outflow rate from said number of transversely spaced first perforated pipes ranges between 20 to 40 $m^3$ per hour per $m^2$ of tube settler lumen surface.

14. The apparatus as in claim 6, wherein a center distance between the number of transversely spaced first perforated pipes ranges between 300 and 400 mm.

15. The apparatus as in claim 14, wherein said center distance between said number of transversely spaced first perforated pipes is about 350 mm.

16. The apparatus as in claim 6, wherein an interspacing between successive said air escape ports of the number of transversely spaced first perforated pipes is substantially equidistant and ranges between 50 to 150 mm.

17. The apparatus as in claim 16, wherein said interspacing of the air escape ports of the number of transversely spaced first perforated pipes is about 100 mm.

18. The apparatus as in claim 6, further including perforated tube laterals, operatively connected to said air compressor member and further providing structural beam support for said tube settler assembly and mounted in transversely spaced register with corresponding said arcuate deflectors, said perforated tube laterals having a plurality of lengthwisely and peripherally spaced air escape bores oriented in such a fashion as to further promote Coanda-effect induced fluid flow towards said bottom mouth and through and into the lumen of tubes of the tube settler assembly.

19. The apparatus as in claim 18, wherein said arcuate deflectors each defines an external convex wall and an internal concave wall, each said external convex wall being oriented for strike by a second fluid outflow from said perforated tube laterals while each said internal concave wall being oriented for strike by the first fluid flow from said first perforated pipes.

20. The apparatus as in claim 19, wherein an interspacing between successive said air escape bores from said perforated tube laterals ranges between 50 and 150 mm, while the corresponding fluid outflow rate ranges between 15 to 35 $m^2$ per hour per $m^2$ of tube settler lumen surface.

* * * * *